(12) United States Patent
Ansari et al.

(10) Patent No.: US 7,728,814 B1
(45) Date of Patent: Jun. 1, 2010

(54) PORTABLE ELECTRONIC DEVICE CONTROL ARM AND RELATED METHOD

(75) Inventors: Yasser Ansari, Mission Viejo, CA (US); Joseph Zueck, Carlsbad, CA (US)

(73) Assignee: Kyocera Wireless Corp., San Diego, CA (US)

( * ) Notice: Subject to any disclaimer, the term of this patent is extended or adjusted under 35 U.S.C. 154(b) by 899 days.

(21) Appl. No.: 11/225,298

(22) Filed: Sep. 12, 2005

(51) Int. Cl.
*G06F 3/045* (2006.01)
(52) U.S. Cl. ........................................ 345/161; 439/165
(58) Field of Classification Search ................ 345/161, 345/156, 167–169; 463/37–38; 273/148 B; 439/165
See application file for complete search history.

(56) References Cited

U.S. PATENT DOCUMENTS

| | | | |
|---|---|---|---|
| 5,436,954 A | 7/1995 | Nishiyama et al. | |
| 5,621,610 A * | 4/1997 | Moore et al. | 361/679.13 |
| 5,841,849 A | 11/1998 | Macor | |
| 6,433,777 B1 * | 8/2002 | Sawyer | 345/161 |
| 6,519,480 B1 | 2/2003 | Wicks et al. | |
| 6,628,266 B1 | 9/2003 | Aguilar et al. | |
| D485,266 S | 1/2004 | Wilson et al. | |
| 6,806,865 B2 | 10/2004 | Oueslati et al. | |
| 2003/0076302 A1 | 4/2003 | Langstraat | |
| 2003/0206151 A1 * | 11/2003 | Oross et al. | 345/156 |
| 2004/0227732 A1 | 11/2004 | Kemppinen | |
| 2005/0057501 A1 | 3/2005 | Young et al. | |
| 2005/0057502 A1 | 3/2005 | Arneson et al. | |
| 2006/0278234 A1 * | 12/2006 | Maatta et al. | 128/206.19 |

* cited by examiner

*Primary Examiner*—Amr Awad
*Assistant Examiner*—Jarurat Suteerawongsa

(57) ABSTRACT

A device and method for providing a control arm integral to a portable electronic device are disclosed. An exemplary device comprises a portable electronic device having a processor communicably coupled with a memory and a control arm, and an enclosure housing the memory and processor and defining a reference surface that defines a reference axis. The control arm has a deployed and a stowed configuration where the control arm length, as measured along the reference axis, is reduced in the stowed configuration.

8 Claims, 3 Drawing Sheets

Stowed

Deployed

Intermediate

Stowed

PORTABLE ELECTRONIC DEVICE CONTROL ARM AND RELATED METHOD

FIELD OF THE INVENTION

This invention generally relates to portable electronic devices and, more particularly, to control arms for a portable electronic device.

BACKGROUND OF THE INVENTION

Portable electronic devices such as wireless communication devices (e.g., mobile cellular phones) typically have input keys, such as buttons and navigation keys, for allowing a user to enter data and issue commands. For certain applications, such as for video games for example, it is desirable to provide controls that allow the user to rapidly issue commands and to provide greater dexterity in controlling the input keys. Control arms (e.g., joysticks) are used for such purposes.

Several challenges are presented in any design that integrates a control arm with a portable electronic device. As discussed below, these challenges are even greater where the device is a wireless communication device due to certain design constraints. One common problem is the interference created by the control arm when not in use. For example, in the case of a portable gaming device, a protruding control arm may necessitate an oversized protective shell for transport. In the case of a personal digital assistant ("PDA"), a protruding control arm may preclude carrying the PDA in one's pocket. In the case of a laptop computer, a protruding control arm may interfere with keyboard entry. Finally, in the case of a mobile phone, a protruding control arm may interfere with the user's positioning of the phone while making a call, or may be a liability to being damaged during normal phone use, i.e. a dropped phone.

One known implementation is to provide a control arm that is detachable from (i.e., non-integral with) the device. However, this approach disadvantageously requires the user to mount and dismount the control arm as needed, and further requires means for securing or stowing the control arm when detached from the device. Such an implementation allows the control arm to easily become lost.

Another known implementation is to provide a control arm that is recessed into the device. A number of computer laptops use this type of control arm as a alternative to the computer mouse. However, this approach disadvantageously limits the user's ability to manipulate the control arm. For example, in this configuration the user typically cannot grasp the control arm and is limited to one-finger operation.

Another known implementation is to provide a control arm that can be pushed down into the device. Similar to the recessed implementation, prior approaches have sacrificed other desirable attributes of the device in order to include this functionality. For example, with respect to devices having an integrated, retractable control arm, prior approaches include lowering the control arm into a cavity within the device. In order to accommodate this linear motion, valuable space (typically along device's smallest dimension) must be compromised. In many cases, a portable electronic device will include a printed circuit board ("PCB") that intersects the travel path of the stowed control arm. Accordingly, a hole in the PCB must be created in order to provide a path for the control arm. In addition to loss of valuable space within the device, a number of drawbacks are presented by requiring holes to be present in PCBs, as is known in the art.

Some existing implementations involving foldable mobile cellular phones call for cumbersome mechanisms that automatically extend and retract the control arm, depending on whether the foldable device is opened or closed. This arrangement is of limited utility since it requires additional components, increases device complexity and costs, requires additional occupation of valuable space, and does not permit a user to retract the control arm while the foldable device is open.

Accordingly, there exists a strong need in the art for a retractable control arm for a portable electronic device which addresses and resolves one or more of the above mentioned problems.

SUMMARY OF THE INVENTION

A device and method for reconfiguring a control arm relative to and integral with a portable electronic device are disclosed. According to one embodiment, a portable electronic device includes a processor, a memory communicably coupled to the processor, an enclosure including at least one external surface, the processor and memory housed within the enclosure, and a control arm communicably coupled to the processor, wherein the control arm converts between a stowed configuration and a deployed configuration, and has a reduced length when stowed, as measured along a predetermined reference axis. The reconfigured control arm has a reduced stowed length relative to a defined reference axis. According to this particular embodiment, the control arm can be retracted without consuming significant valuable internal device space and without requiring holes to be provided in the PCB.

Although the invention has been presented in the context of a mobile phone, it should be understood that the invention is not limited to such an application. Further, although specific arrangements of control arms, enclosures, reference axes have been presented, it should be understood that alternate arrangements and combinations of the features are contemplated by and are within the scope of the present invention. Additional details of the device and method for reconfiguring a control arm are provided in the detailed description that follows.

DETAILED DESCRIPTION OF THE INVENTION

Figure 1:
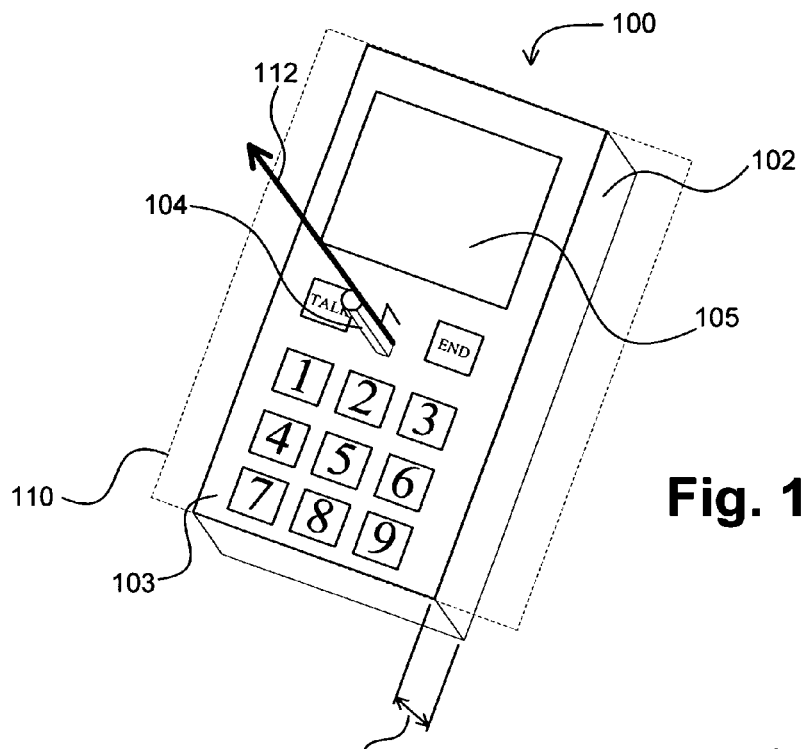
FIG. 1 depicts a portable electronic device according to one embodiment of the present invention.

Referring to FIG. 1, portable electronic device 100 according to one embodiment of the present invention is shown. According to this particular embodiment, portable electronic device 100 is a mobile phone; however, the present invention is not limited to mobile phones. As shown in FIG. 1, Mobile phone 100 includes a processor (not shown), a memory (not shown), enclosure 102, and control arm 104 integrated with mobile phone 100. The processor is communicably coupled to the memory and to control arm 104. The memory and the processor are typically housed within enclosure 102.

As shown in FIG. 1, control arm 104 may a joystick. By way of example, control arm 104 provides a mechanical means for communicating directional commands to the processor, e.g., for manipulating motion on a display screen of the device. In certain embodiments, control arm 104 may provide for supplemental user input, such as by the inclusion of one or more buttons. According to another embodiment, control arm 104 may be configured to communicate rotational commands to the processor, e.g., by twisting control arm 104. Control arm 104 may comprise other means for communicating user commands to a processor in order to provide both a deployed configuration and a stowed configuration, wherein the control arm remains integral to the portable electronic device.

As with control arm 104, enclosure 102 (illustrated as a "housing" or "chassis" in the drawings) is not limited to any shape or form. However, enclosure 102 will have at least one external surface that defines a "reference" surface. As shown in FIG. 1, enclosure 102 of mobile phone 100 has several external surfaces, such as, front, back, and side, for example. One of these illustrated external surfaces is generally defined as the mobile phone's face. According to the particular embodiment illustrated in FIG. 1, control arm 104 is situated on mobile phone face 103 to facilitate the user's ability to access control arm 104 while simultaneously viewing display 105.

In this particular case, mobile phone face 103 is also used to define reference surface 110, wherein reference surface 110 is, for the present illustration, defined as a plane substantially parallel to mobile phone face 103. As shown in FIG. 1, reference axis 112 is defined along a line substantially perpendicular to reference surface 110, and control arm 104 has a longitudinal axis along reference axis 112.

According to this particular arrangement, it is least desirable for a control arm to be stowed in the direction of mobile phone's 100 narrowest dimension 111, and perpendicular to the mobile phone's 100 PCB (not shown). Note, one skilled in the art will recognize that a portable electronic device, such as mobile phone 100, will typically have a PCB, internal to the device, that is substantially parallel to mobile phone face 103. As shown in FIG. 1, reference axis 112 is an axis substantially perpendicular to mobile phone face 103 and the PCB (not shown). Reference axis 112 is also generally along the narrowest dimension 111 of mobile phone 100.

Figure 2B:
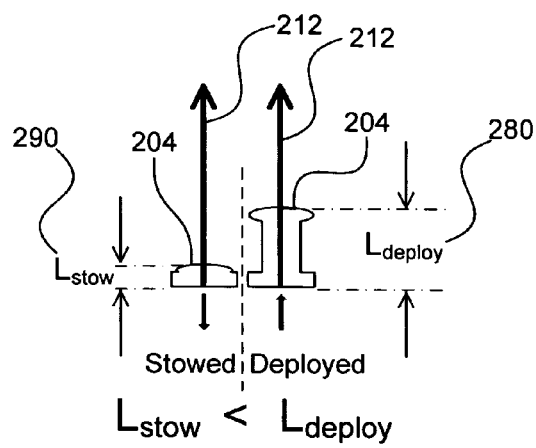
FIG. 2B depicts a portable electronic device having a control arm according to another embodiment of the present invention, wherein the control arm is shown in isolation in a stowed and a deployed configuration.
Figure 2A:
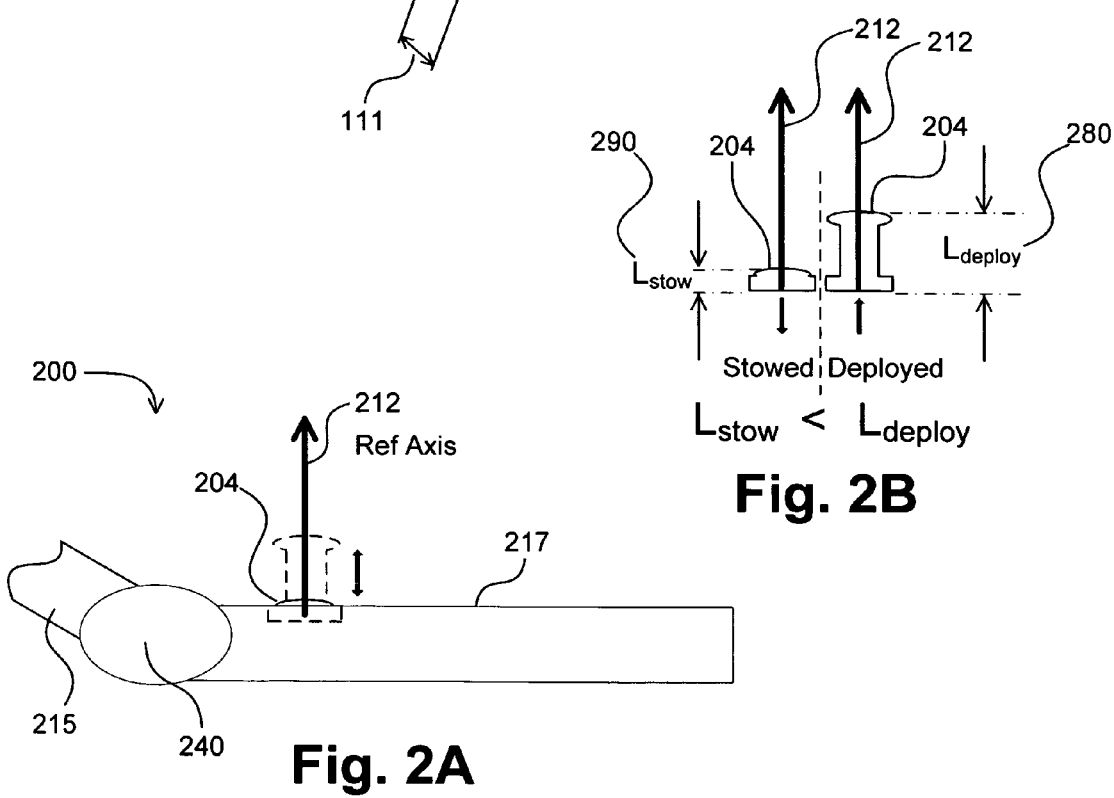
FIG. 2A depicts a portable electronic device having a control arm according to another embodiment of the present invention, wherein the control arm is shown in a stowed and a deployed configuration.

Referring now to FIG. 2A, there is shown exemplary portable electronic device having control arm 204 according to one embodiment of the present invention. In this particular embodiment, the portable electronic device is illustrated as flip phone 200, where flip cover 215 is only partially shown. Flip phone 200 has at least two phone configurations, open and closed. As illustrated, control arm 204 is retractable into flip phone 200, and thus, control arm 204 has both a stowed configuration and a deployed configuration. Also, reference axis 212 is illustrated as coinciding with control arm 204, perpendicular to base portion 217 of flip phone 200, and pointing outward from flip phone 200.

For reference, FIG. 2B depicts control arm 204 in isolation, in both its stowed configuration and its deployed configuration. This view represents a simplified exemplary illustration of the relationship between the stowed configuration of control arm 204 and the deployed configuration of the control arm 204.

When in the deployed configuration, control arm 204 will have "deployed length" 280, as measured along reference axis 212. Also, when deployed, control arm 204 can be manipulated by the user according to its intended functionality. For example, it the case of a joystick, user manipulation would include applying lateral forces to the joystick. In alternate embodiments, a control arm might be manipulated by rotational motion, user proximity, or other methods for sensing a user command.

When positioned in the stowed configuration, control 204 arm will have "stowed length" 290, as measured along reference axis 212. The relationship between stowed configuration of control arm 204 and the deployed configuration of control arm 204 is such that stowed length 290 is less than deployed length 280.

Referring back to FIG. 2A, control arm 204 may be designed or positioned such that it does not interfere with the operation of flip phone 200 when in the stowed configuration. This may be achieved through a variety of methods. For example, control arm 204, as illustrated, has a low profile head that minimizes its degree of protrusion from base portion 217 of flip phone 200. In other alternate embodiments, control arm 204 may be repositioned into a recess within the enclosure, such that no portion of control arm 204 protrudes from the outer contour of flip phone 200.

In some cases, according to this embodiment, the PCB (not shown) may represent the limit to which the control arm may be inserted into flip phone 200. As discussed above, there are drawbacks typically associated with coming in contact with and, passing through, a mobile phone PCB. These drawbacks typically include reduced usable PCB area, leading to reduced overall performance, and increased manufacturing challenges.

As shown in FIG. 2A and FIG. 2B, according to this particular embodiment, the user may stow control arm 204 at any time, by applying a downward axial force to control arm 204, for example. Other techniques for stowing control arm 204 may be employed in other embodiments. However, it is generally preferable that the user be able to stow control arm 204 at any time, independent of the configuration of flip phone 200. For example, as illustrated here, the user may place control arm 204 in its stowed configuration while flip phone 200 is open.

According to the present illustration, control arm 204 is centrally integrated in base portion 217 of flip phone 200, however, the control arm may be alternately integrated elsewhere. For example, in other embodiments, a control arm 204 may have been integrated into the side of flip phone 200, rather than its face.

According to one particular embodiment (not shown), control arm 204 is integrated into hinge 240. Placement in hinge 240 may provide for the added benefit of increased storage area, allowing for a larger control arm, as well as circumvention of the issues associated with PCB interference. The invention in no way limits the placement of a control arm relative a portable electronic device, and that control arm placement may utilize certain inherent advantages of a particular enclosure.

Figure 3:
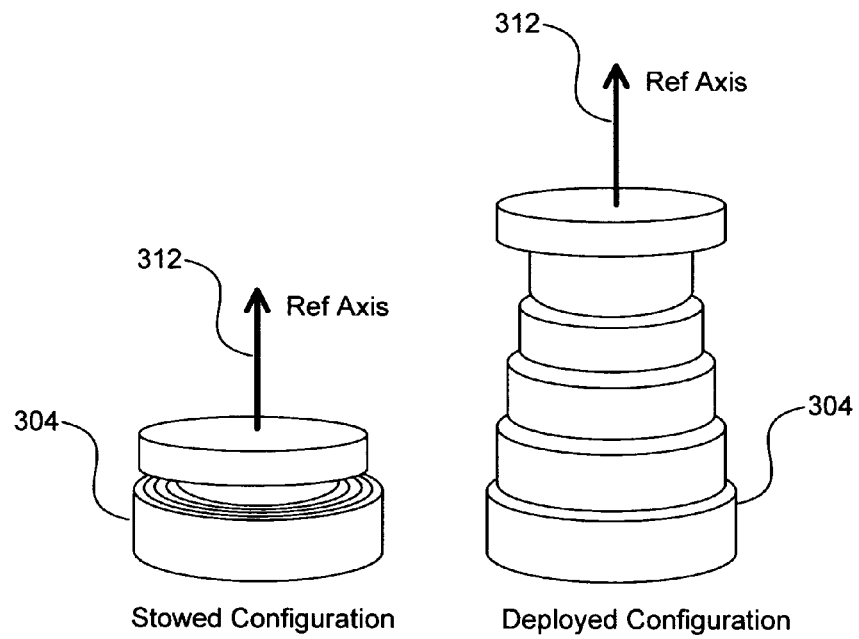
FIG. 3 depicts a control arm having a stowed length that is less than its deployed length as measured along a reference axis according to one embodiment of the present invention.

FIG. 3 shows one example of control arm 304, depicted in isolation, having a stowed length that is less than its deployed length as measured along reference axis 312. The limitation of a reduced stowed length can be achieved by various means. According to this particular embodiment, control arm 312 can be described as a telescoping joystick. However, this embodiment is made by way of example, and is not intended to be limiting.

Figure 4:
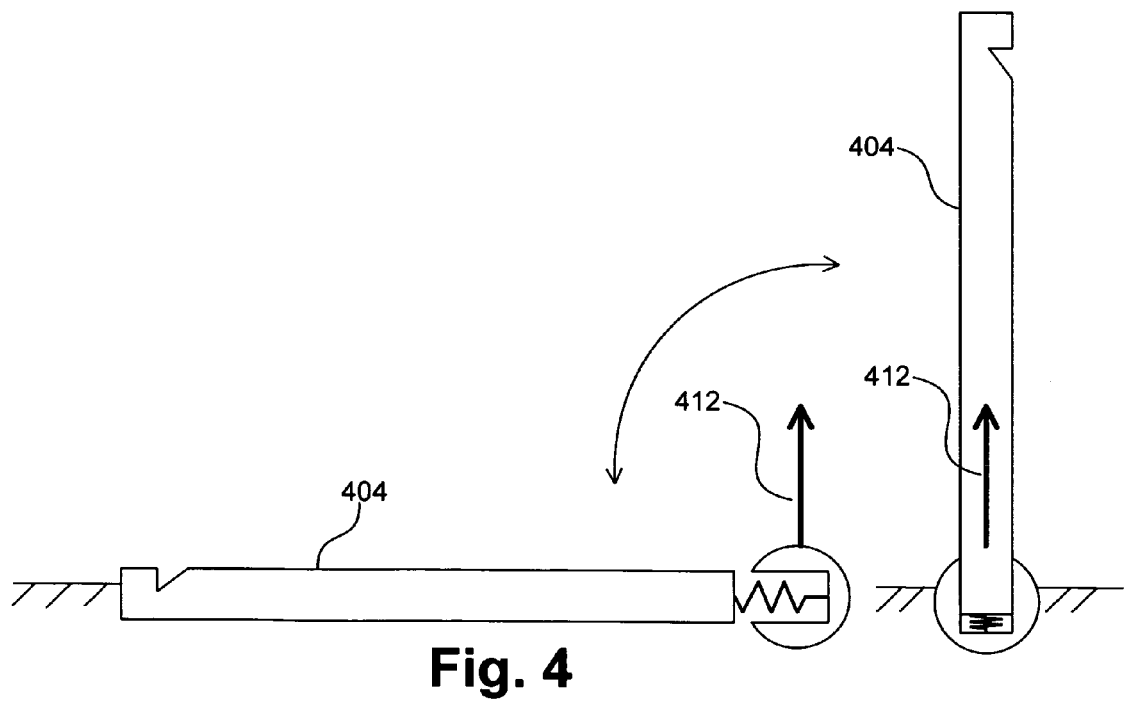
FIG. 4 depicts a control arm in a horizontal stowed configuration and reoriented to a vertical deployed configuration.

According to an alternative embodiment, the control arm may be reoriented relative to the portable electronic device. FIG. 4 shows control arm 404, depicted in isolation, in a horizontal stowed configuration and reoriented to a vertical deployed configuration. Thus, control arm 404 may pivot or "flip up" from its stowed configuration to its deployed configuration, wherein the longitudinal length of control arm 404 remains constant while its stowed length, as measured along reference axis 412, will still be significantly reduced.

According to another alternative embodiment (not shown), the control arm may "slide up" from a stowed configuration to a deployed configuration. As with the pivoting "flip" control arm above, the control arm is substantially perpendicular to the reference axis when in the stowed configuration, but is substantially parallel with the reference axis when in the deployed configuration. The control arm may be "slid up" by providing a curved guide path within the device, and moving the control arm along this guiding path. It is noted that the control arm travel is not limited to a curved path, but may include any reorientation path. Like the pivoting "flip" control arm above, this embodiment may result in the control arm maintaining its overall length, while still significantly reducing its stowed length.

Figure 5A:
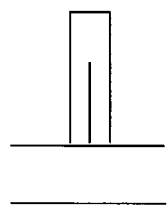
FIG. 5A depicts a control arm, in isolation, in its deployed configuration according to one embodiment of the present invention.
Figure 5B:
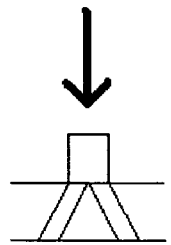
FIG. 5B depicts a control arm, in isolation, transitioning between its deployed configuration and its stowed configuration according to one embodiment of the present invention.
Figure 5C:
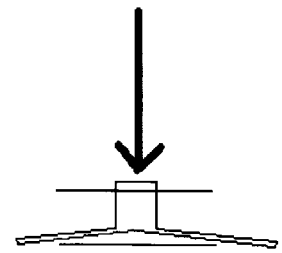
FIG. 5C depicts a control arm in isolation in its stowed configuration according to one embodiment of the present invention.

FIGS. 5A-5C depict a control arm, in isolation, according to yet another alternative embodiment. Here, the control arm may be segmented into a plurality axial segments for stowage, wherein the individual segments of the segmented control arm radiate into directions substantially perpendicular to the reference axis. Then, upon deployment, the individual segments of the segmented control arm may be regrouped into a singular, integral control arm, substantially parallel with the reference axis. According to this alternate embodiment, the control arm may be composed of flexible members that do not require pivots or guides as with their rigid counterparts. Like the alternate embodiments discussed above, this embodiment will provide for reorienting the control arm between a deployed and a stowed configuration. However, as shown in FIG. 5C, by segmenting the control arm, the individual segments, being a fraction of a whole, may occupy even less space in the direction of the reference axis when stowed, while having strength comparable to an integral control arm when deployed.

A device and method has been provided for a portable electronic device with a stowable control arm having a reduced stowed length, relative to a defined reference axis. Although the invention has been presented in the context of a mobile phone, it should be understood that the invention has wider application. Further, although specific arrangements of control arms, enclosures, reference axes has been presented, it should be understood that alternate arrangements and combinations of the features are contemplated for use with the present invention. Other variations and embodiments of the invention will occur to those skilled in the art.

What is claimed is:

1. A mobile flip phone comprising:
   a processor;
   a memory communicably coupled to the processor;
   an enclosure including at least one external surface, the processor and memory housed within the enclosure, the at least one external surface defining a reference surface and a reference axis, the reference axis defined along a path substantially perpendicular to the reference surface;
   a flip cover;
   a flip base portion;
   a hinge between the flip cover and the flip base portion;
   a control arm disposed in the hinge, wherein the control arm is communicably coupled to the processor to receive user input, the control arm convertible between a stowed configuration and a deployed configuration, the control arm defining a deployed length measured along the reference axis when the control arm is in the deployed configuration, the control arm further defining a stowed length measured along the reference axis when the control arm is in the stowed configuration, the stowed length less than the deployed length;
   the deployed control arm configuration communicates rotational commands to the processor when the control arm is twisted;
   the control arm that telescopes between the deployed configuration and the stowed configuration, wherein the control arm is at least partially displaced into the hinge when the control arm is placed in the stowed configuration by separating the control arm into at least two components, and spreading the components substantially into a plane parallel to the reference surface; and the stowed control arm configuration not interfering with operations of the mobile phone;
   wherein the control arm is integral to the mobile phone;
   wherein, upon placing the control arm in the stowed configuration, the control arm length along the reference axis is reduced by at least partially reorienting the control arm, or a portion thereof; and
   wherein the control arm is placed in the stowed configuration by pivotally rotating the control arm.

2. The mobile phone of claim 1 wherein the mobile phone has an open configuration and a closed configuration; and wherein the control arm can be placed in the stowed configuration while the mobile phone is in the open configuration.

3. The mobile phone of claim 1 wherein the control arm is placed in the stowed configuration by sliding the control arm along a path.

4. The mobile phone of claim 1 wherein the control arm is a joystick.

5. A mobile flip phone comprising:
   processing means;
   memory means communicably coupled to the processing means;
   an enclosure including at least one external surface, the processing means and memory means housed within the enclosure, the at least one external surface defining a reference surface and a reference axis, the reference axis defined along a path substantially perpendicular to the reference surface;
   a flip cover;
   a flip base portion;
   a hinge between the flip cover and the flip base portion;
   input control means disposed in the hinge, wherein the input control means is communicably coupled to the processing means to receive user input, the input control means convertible between a stowed configuration and a deployed configuration, the input control means defining a deployed length measured along the reference axis when the input control means is in the deployed configuration, the input control means further defining a stowed length measured along the reference axis when the input control means is in the stowed configuration, the stowed length less than the deployed length;
the input control means in the deployed configuration communicates rotational commands to the processor when the control arm is twisted;
the input control means that telescopes between the deployed configuration and the stowed configuration, wherein the input control means is at least partially displaced into the hinge when the input control means is placed in the stowed configuration by separating the control arm into at least two components, and spreading the components substantially into a plane parallel to the reference surface; and
the input control means in the stowed configuration not interfering with operations of the mobile phone;
wherein the input control means is integral to the portable communication device;
wherein, upon placing the input control means in the stowed configuration, the input control means length along the reference axis is reduced by at least partially reorienting the input control means, or a portion thereof; and
wherein the input control means is placed in the stowed configuration by pivotally rotating the input control means.

6. The mobile phone of claim 5 wherein the mobile phone has an open configuration and a closed configuration; and wherein the input control means can be placed in the stowed configuration while the mobile phone is in the open configuration.

7. The mobile phone of claim 5 wherein the input control means is placed in the stowed configuration by sliding the input control means along a path.

8. The mobile phone of claim 5 wherein the input control means is a joystick.

* * * * *